(12) United States Patent
Okutsu et al.

(10) Patent No.: US 8,916,700 B2
(45) Date of Patent: Dec. 23, 2014

(54) METHOD FOR PRODUCING CELLULOSE ETHER DERIVATIVE

(75) Inventors: Munehisa Okutsu, Wakayama (JP); Takeshi Ihara, Wakayama (JP)

(73) Assignee: Kao Corporation, Tokyo (JP)

( * ) Notice: Subject to any disclaimer, the term of this patent is extended or adjusted under 35 U.S.C. 154(b) by 585 days.

(21) Appl. No.: 12/742,175

(22) PCT Filed: Nov. 11, 2008

(86) PCT No.: PCT/JP2008/070486
§ 371 (c)(1),
(2), (4) Date: Aug. 24, 2010

(87) PCT Pub. No.: WO2009/063856
PCT Pub. Date: May 22, 2009

(65) Prior Publication Data
US 2010/0311964 A1 Dec. 9, 2010

(30) Foreign Application Priority Data
Nov. 14, 2007 (JP) ................................. 2007-295905

(51) Int. Cl.
*C07H 1/00* (2006.01)
*C07H 1/06* (2006.01)
*C08B 11/00* (2006.01)
*C08B 11/02* (2006.01)
*C08B 11/12* (2006.01)
*C08H 8/00* (2010.01)
*C08B 1/12* (2006.01)
*C08B 1/06* (2006.01)
*C08B 1/08* (2006.01)

(52) U.S. Cl.
CPC ........ *C08B 11/00* (2013.01); *C08H 8/00* (2013.01); *C08B 1/12* (2013.01); *C08B 11/02* (2013.01); *C08B 11/12* (2013.01); *C08B 1/06* (2013.01); *C08B 1/08* (2013.01)
USPC ................................. 536/124; 536/84; 536/86

(58) Field of Classification Search
CPC ...................................................... C08B 11/008
USPC .............................................. 536/124, 84, 86
See application file for complete search history.

(56) References Cited

U.S. PATENT DOCUMENTS

| 2,338,876 | A | * | 1/1944 | Slansky ......................... 423/163 |
| 2,618,632 | A | * | 11/1952 | Klug ................................ 536/91 |
| 3,936,441 | A | * | 2/1976 | Holst et al. ...................... 536/44 |
| 4,477,657 | A | | 10/1984 | Strange et al. |
| 5,417,984 | A | * | 5/1995 | Banker et al. ................. 424/488 |
| 6,392,035 | B1 | | 5/2002 | Karstens et al. |
| 6,548,730 | B1 | | 4/2003 | Patel et al. |

FOREIGN PATENT DOCUMENTS

| EP | 1734055 A2 * | 12/2006 |
| JP | 52-22079 | 2/1977 |
| JP | 57-2301 | 1/1982 |
| JP | 60 20901 | 2/1985 |
| JP | 61 241337 | 10/1986 |
| JP | 62 236801 | 10/1987 |
| JP | 2000 513042 | 10/2000 |
| JP | 2001 86957 | 4/2001 |
| JP | 2002 512271 | 4/2002 |
| JP | 2004-331918 | 11/2004 |

OTHER PUBLICATIONS

Mandels et al ("Enzymatic Hydrolysis of Waste Cellulose", Biotechnology and Bioengineering, vol. XVI, p. 1471-1793 (1974)).*
JP 2002-512271 A, Machine Translated Copy, 2002.*
Extended European Search Report issued May 24, 2012, in European Patent Application No. 08850551.6.
U.S. Appl. No. 12/739,318, filed Apr. 22, 2010, Okutsu, et al.
Office Action issued on Jul. 18, 2011 in the corresponding Chinese Patent Application No. 200880115620.2 (with English Translation).
Office Action issued on May 25, 2012 in Chinese Patent Application No. 200880115620.2 (with English Translation).
Notification of Reasons for Refusal issued Dec. 18, 2012, in Japanese Patent Application No. 2007-295905 filed Nov. 14, 2007 (with English translation).
Office Action issued Mar. 26, 2013, in European Patent Application No. 08850551.6 filed Nov. 11, 2008.

\* cited by examiner

*Primary Examiner* — Patrick Lewis
*Assistant Examiner* — Everett White
(74) *Attorney, Agent, or Firm* — Oblon, Spivak, McClelland, Maier & Neustadt, L.L.P.

(57) ABSTRACT

The present invention relates to a process for selectively producing a cellulose ether derivative with a very high reaction efficiency of an organohalide compound. There is provided a process for producing a cellulose ether derivative such as carboxymethyl cellulose and hydroxyethyl cellulose in which a low-crystalline powdery cellulose having a crystallinity of 50% or less is reacted with an organohalide compound such as ethylene chlorohydrin, a monohaloacetic acid and a salt of the monohaloacetic acid in the presence of a base.

18 Claims, 1 Drawing Sheet

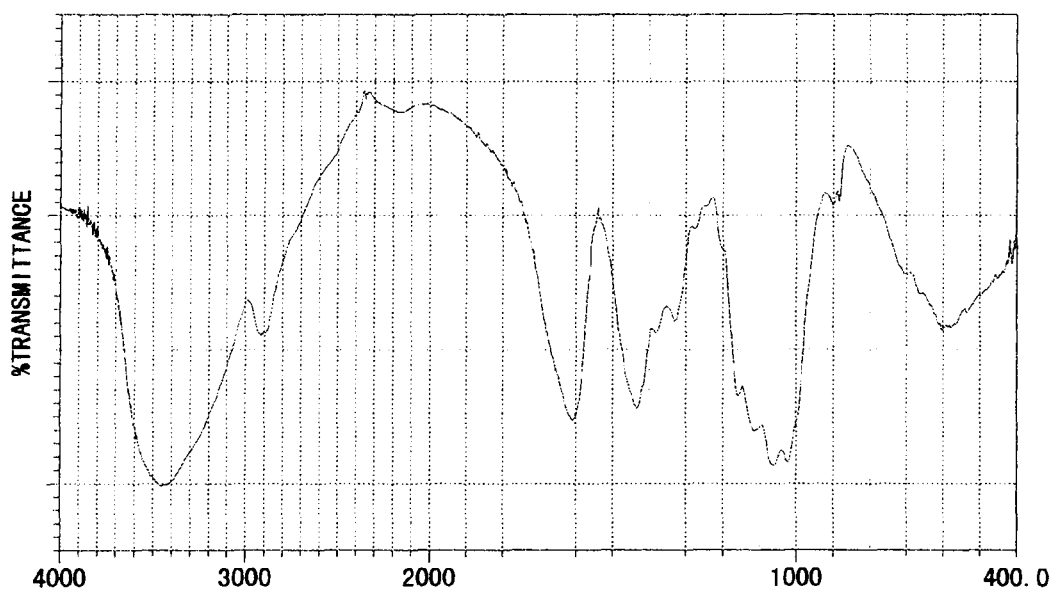

METHOD FOR PRODUCING CELLULOSE ETHER DERIVATIVE

FIELD OF THE INVENTION

The present invention relates to a process for producing cellulose ether derivatives.

BACKGROUND OF THE INVENTION

Cellulose ether derivatives, in particular, carboxymethyl cellulose or hydroxyethyl cellulose, have been used in extensive applications, and also used as a starting material for production of other cellulose derivatives. Many methods for production of the cellulose ether derivatives have been conventionally reported.

Carboxymethyl cellulose (hereinafter occasionally referred to merely as "CMC") has been used in various applications such as thickeners, dispersants, emulsifiers, protective colloid agents and, stabilizers. CMC has been industrially produced by a solvent method in which cellulose is treated and activated with a large amount of an aqueous alkali solution to produce an alkali cellulose (cellulose alkalization) and then the resulting alkali cellulose is dispersed in a water-containing organic solvent to react with a monohaloacetic acid. In the solvent method, a hydrophilic solvent such as isopropanol is used, so that side reactions between the solvent or water and the monohaloacetic acid inevitably occur. Owing to a poor reactivity of the monohaloacetic acid to cellulose, an excessive amount of the monohaloacetic acid must be used for the purpose of attaining a desired substitution degree thereof. In addition, the above method has such a large burden that an additional purification step is needed for removing neutralized salts derived from an excessive amount of the alkali used, hydroxymethyl acetic acid salts as by-products, etc., by washing or the like.

JP 9-176201A discloses the method for production of CMC in which the reaction of cellulose with a monohaloacetic acid is carried out while being kept under neutral to weakly basic condition in order to enhance a reaction efficiency of the monohaloacetic acid. However, the method is still unsatisfactory because the effective utilization efficiency of the monohaloacetic acid is as low as 58 to 65%.

On the other hand, hydroxyethyl cellulose has been extensively used as a compounding component such as a dispersant and a stabilizer which are compounded in paints, cosmetics, building materials, thickeners, adhesives, drugs or the like.

Hydroxyethyl cellulose has been generally produced by a similar method to that used for production of CMC in which cellulose is treated and activated with a large amount of an aqueous alkali solution to prepare an alkali cellulose (cellulose alkalization) and then the resulting alkali cellulose is reacted with ethyleneoxide as an etherifying agent.

In the cellulose alkalization step, in order to remove a surplus amount of alkali or water from an alkali cellulose produced in the step, very complicated procedures such as filtration and squeezing are needed.

However, even when subjected to filtration or squeezing, the alkali cellulose usually still contains residual water in an amount equal to or more than the amount of the alkali cellulose. Further, it is considered that in the alkali cellulose obtained by the cellulose alkalization step, a majority of hydroxyl groups contained in a molecule of the cellulose are present in the form of an alcoholate. In fact, the alkali cellulose contains an alkali in an amount of usually about 3 mol, at least 1 mol, per a glucose unit in a molecule of the cellulose.

Although a cellulose ether is obtained by adding an etherifying agent such as ethyleneoxide to the cellulose thus activated by cellulose alkalization, the above-mentioned residual water that still remains in an amount equal to or more than the amount of the alkali cellulose even after the cellulose alkalization is also reacted (hydrated) with ethyleneoxide as the etherifying agent, so that a large amount of by-products such as ethylene glycol are produced.

In addition, since the reaction is usually carried out in a slurried condition, the reaction rate of ethyleneoxide to the cellulose is low. Therefore, in order to enhance the reaction rate of ethyleneoxide to the cellulose, it is required that ethyleneoxide is used in an excessive amount. Further, ethylene glycol as a by-product is readily reacted with ethyleneoxide as the etherifying agent, resulting in production of a large amount of polyoxyethylene as a by-product. In addition, an excessive amount of alkali and a large amount of water which are present in the reaction system tend to cause not only increase in amount of the reaction product but also considerable increase in amounts of the by-products, which tends to result in gelling of the reaction system.

To solve the above problems, not only water but also various polar solvents may be added to the reaction system to effectively conduct the slurry reaction. For example, in JP 8-245701A and JP 6-199902A, there is described the method of separating and recovering the solvent from a water phase of the reaction system after the cellulose alkalization and the reaction with the etherifying agent, by adding thereto a polar solvent that is hardly compatible with water such as tert-butanol and methyl isobutyl ketone in the reaction. However, unless any measure for considerably reducing the amounts of the alkali and water is taken, it is substantially difficult to reduce the amounts of the by-products such as ethylene glycol to a large extent.

Also, since the use of ethyleneoxide as the etherifying agent is strictly limited by the safety standard for high-pressure gases, there are many limitations to facilities used in the above method when industrially practiced.

Therefore, from the industrial viewpoints, it is useful to develop a process for producing cellulose ether derivatives in a convenient and efficient manner with a less amount of wastes.

SUMMARY OF THE INVENTION

The present invention relates to a process for producing a cellulose ether derivative by reacting a low-crystalline powdery cellulose with an organohalide compound in the presence of a base.

BRIEF DESCRIPTION OF THE DRAWING

FIG. 1 is a view showing an infrared absorption spectrum of carboxymethyl cellulose (of an Na salt type) obtained in Example 1-1.

DETAILED DESCRIPTION OF THE INVENTION

The present invention relates to a process for selectively producing a cellulose ether derivative with a very high reaction efficiency of an organohalide compound.

The present inventors have found that when using a low-crystalline powdery cellulose as a raw reactant material, the reaction of the cellulose with an organohalide compound can proceed in an extremely efficient and selective manner.

That is, the present invention is characterized by the process for producing a cellulose ether derivative in which a low-crystalline powdery cellulose having a crystallinity of 50% or less is reacted with an organohalide compound in the presence of a base. As the organohalide compound, there are preferably used at least one compound selected from the group consisting of ethylene chlorohydrin, a monohaloacetic acid and a salt of the monohaloacetic acid. When using the above organohalide compound, carboxymethyl cellulose and/or hydroxyethyl cellulose can be produced.

That is, in the first embodiment of the present invention, there is provided a process for producing carboxymethyl cellulose in which a low-crystalline powdery cellulose having a crystallinity of 50% or less is reacted with a monohaloacetic acid or a salt of the monohaloacetic acid (hereinafter occasionally referred to merely as "monohaloacetic acid or the like") in the presence of a base.

In the second embodiment of the present invention, there is provided a process for producing hydroxyethyl cellulose in which a low-crystalline powdery cellulose having a crystallinity of 50% or less is reacted with ethylene chlorohydrin in the presence of a base.

The respective components and reaction conditions, etc., used in the respective processes according to the present invention are explained below.

[Low-Crystalline Powdery Cellulose]

It is known that celluloses have several crystal structures whose crystallinity is generally calculated from the ratio of an amount of a crystalline moiety to a whole amount of an amorphous moiety partially existing therein and the crystalline moiety.

The term "crystallinity" as used in the present invention means a crystallinity of cellulose I derived from a crystal structure of natural celluloses and calculated from a diffraction intensity value determined by powder X-ray diffraction spectrum method according to Segal method. The crystallinity is defined by the following formula (1):

$$\text{Cellulose } I\text{-type Crystallinity (\%)} = [(I_{22.6} - I_{18.5})/I_{22.6}] \times 100 \quad (1)$$

wherein $I_{22.6}$ is a diffraction intensity of a lattice plane ((002) plane) as measured at a diffraction angle $2\theta$ of 22.6° in X-ray diffraction analysis; and $I_{18.5}$ is a diffraction intensity of an amorphous moiety as measured at a diffraction angle $2\theta$ of 18.5° in X-ray diffraction analysis.

The term "low-crystalline" as used herein means the condition in which the proportion of the amorphous moiety in a crystal structure of the cellulose is large, more specifically, means that the cellulose I-type crystallinity calculated from the above formula (1) is preferably 50% or less, and includes the condition in which the cellulose is completely amorphized, i.e., the crystallinity is 0%.

Ordinary powdery celluloses are so-called crystalline celluloses which contain an amorphous moiety in a small amount and whose crystallinity as calculated from the above formula (1) generally lies within the range of from about 60 to about 80%. These crystalline celluloses exhibit an extremely low reactivity for synthesis of ordinary cellulose derivatives. On the contrary, the low-crystalline powdery cellulose used in the present invention has an excellent chemical reactivity.

The crystallinity of the low-crystalline powdery cellulose used in the present invention as calculated from the above formula (1) is 50% or less, preferably 40% or less and more preferably 30% or less from the viewpoint of a good chemical reactivity thereof. When the crystallinity of the low-crystalline powdery cellulose is 50% or less, the reaction of the low-crystalline powdery cellulose with the monohaloacetic acid or the like in the presence of a base proceeds very smoothly, so that the cellulose etherification reaction can be carried out with a high selectivity, and it is possible to reduce localization of moieties of the cellulose into which the substituent group is to be introduced. From these viewpoints, completely amorphized celluloses, i.e., so-called non-crystalline celluloses having a crystallinity of substantially 0% as calculated from the above formula (1), are most preferably used.

Meanwhile, the cellulose I-type crystallinity defined by the above formula (1) might be sometimes calculated as a negative value (minus value). The cellulose I-type crystallinity having such a minus value is regarded as 0%.

The average particle size of the low-crystalline powdery cellulose is preferably 300 μm or less, more preferably 150 μm or less, still more preferably 100 μm or less and further still more preferably 50 μm or less in view of attaining a good chemical reactivity of the low-crystalline cellulose when used as an industrial raw material and ensuring a good fluidity of the cellulose as a powder. However, from the viewpoint of easiness in handling upon industrial use, the average particle size of the low-crystalline powdery cellulose is preferably 20 μm or more and more preferably 25 μm or more.

In addition, in order to avoid inclusion of a trace amount of coarse particles produced owing to aggregation, etc., it is preferred that the low-crystalline powdery cellulose used in the above reaction be an undersize product obtained by passing it through a sieve having a mesh size of about 25 to about 100 μm, if required.

The polymerization degree of the low-crystalline powdery cellulose is from 100 to 2,000 and more preferably from 100 to 1,000 from the viewpoints of a good chemical reactivity and easiness in handling when used as raw pulps or industrially practiced.

[Production of Low-Crystalline Powdery Cellulose]

The low-crystalline powdery cellulose used in the present invention may be produced from sheet-like or roll-like pulps having a high cellulose purity as generally available raw materials. For example, the low-crystalline powdery cellulose may be produced by the methods described in JP 62-236801A, JP 2003-64184A, JP 2004-331918A, etc.

The low-crystalline powdery cellulose may also be efficiently produced, for example, by the method in which chip-like pulps preferably having a size of from 1 to 50 mm square and more preferably from 1 to 30 mm square which are obtained by coarsely crushing sheet-like pulps are treated by an extruder and then further by a ball mill.

In the above method, either a single-screw or twin-screw extruder may be used as the extruder. From the viewpoint of applying a strong compression shear force to the pulps, those extruders equipped with a so-called kneading disk block in any of screws thereof are preferably used.

The kneading disk block is constructed of a plurality of kneading disks which are continuously combined with each other while being offset at constant phase intervals. For example, from 3 to 20, preferably from 6 to 16 kneading disks may be combined with each other while being offset at 90° phase intervals. The kneading disk block is capable of continuously treating chip-like pulps by forcibly passing the chip-like pulps through a narrow gap between the kneading disks with rotation of the screws to apply an extremely strong shear force thereto. The shear rate in the above treatment using the extruder is preferably from 600 to 3,000 $\text{sec}^{-1}$ and more preferably from 600 to 2,000 $\text{sec}^{-1}$.

Examples of the ball mill used in the above method include known ball mills such as a vibrating ball mill, a media-stirring mill, a rotating ball mill and a planetary ball mill. The material of balls used as milling media in these ball mills is not particularly limited. Examples of the material of the balls include iron, stainless steel, alumina and zirconia. The outer diameter of the respective balls is preferably from 0.1 to 100 mm from the viewpoint of efficiently reducing a crystallinity of the cellulose to be treated. The shape of the milling media used in the ball mills is not particularly limited to a ball shape, but may also be a rod shape or a tubular shape.

The treating time of the pulps in the ball mills is preferably from 5 min to 72 h to reduce a crystallinity of the cellulose to be treated. The ball mill treatment of the pulps is carried out at a temperature of 250° C. or lower and preferably from 5 to 200° C. to minimize degradation or deterioration of the resulting cellulose due to heat generated upon the treatment. If required, the ball mill treatment may be conducted in an atmosphere of an inert gas such as nitrogen.

According to the above method, it is also possible to well control a molecular weight of the resulting cellulose. More specifically, by using the above method, it is possible to readily produce a powdery cellulose having a high polymerization degree and a low crystallinity which is, in general, hardly available.

[Production of Carboxymethyl Cellulose]

In the process for producing carboxymethyl cellulose according to the first embodiment of the present invention, the above low-crystalline powdery cellulose is reacted with a monohaloacetic acid or a salt thereof in the presence of a base.

Examples of the monohaloacetic acid or the salt thereof used in the above reaction include monochloroacetic acid, monobromoacetic acid, sodium monochloroacetate and potassium monochloroacetate. Among these monohaloacetic acids and the salts thereof, sodium monochloroacetate is especially preferred.

The base used in the above reaction is not particularly limited. Examples of the base include alkali metal hydroxides such as sodium hydroxide, potassium hydroxide and lithium hydroxide; alkali earth metal hydroxides such as magnesium hydroxide and calcium hydroxide; and tertiary amines such as trimethylamine, triethylamine and triethylene diamine. Among these bases, preferred are alkali metal hydroxides, more preferred are sodium hydroxide and potassium hydroxide, and still more preferred is sodium hydroxide.

The above monohaloacetic acids or the salts thereof and the above bases may be respectively used alone or in combination of any two or more thereof.

In the above first embodiment of the present invention, for the purposes of improving a dispersibility of the cellulose as well as a mixability of the cellulose with the base and the monohaloacetic acid or the like, the reaction may be carried out in the presence of an organic solvent.

Examples of the organic solvent used in the reaction include secondary or tertiary lower alcohols such as isopropanol and tert-butanol; ether solvents such as 1,4-dioxane, ethylene glycol dimethyl ether and diglymes or triglymes such as diethylene glycol dimethyl ether; and hydrophilic polar solvents such as dimethyl sulfoxide. In addition, there may also be used a non-aqueous low-polar or non-polar solvent such as toluene, benzene, hexane and other hydrocarbons oils.

The above solvents may be used alone or in combination of any two or more thereof.

(Addition of Base and Monohaloacetic Acid or the Like)

The method of adding the base is not particularly limited. For example, the base may be added by (i) a method in which after previously mixing the low-crystalline powdery cellulose with the monohaloacetic acid or the like, an aqueous solution of the base is dropped into the resulting mixture; or (ii) a method in which after previously mixing the low-crystalline powdery cellulose with the base, the monohaloacetic acid or the like is added to the resulting mixture. Among these methods, from the viewpoints of well controlling the reaction temperature and preventing formation of masses (lumps), the method (i) is preferably used.

The form or condition of the base added is not particularly limited. Therefore, the base may be added in an anhydrous condition or in the form of an aqueous solution. However, when adding the base by the above method (i), the based is preferably added in the form of an aqueous solution. The concentration of the base in the aqueous solution is not particularly limited, and is preferably in the range of from 20 to 50% by weight.

The method of adding the monohaloacetic acid or the like is not particularly limited. For example, the monohaloacetic acid or the like may be added by (iii) a method in which after adding the base to the low-crystalline powdery cellulose, the monohaloacetic acid or the like may be gradually dropped into the resulting mixture, or (iv) a method in which after adding the monohaloacetic acid or the like to the low-crystalline powdery cellulose at one time, the base is added to the resulting mixture to react therewith.

(Amounts of Base and Monohaloacetic Acid or the Like Used)

In the first embodiment of the present invention, the reaction proceeds substantially in a quantitative manner owing to an extremely high efficiency of the reaction between the powdery cellulose and the monohaloacetic acid or the salt thereof. For this reason, it will be satisfactory to use the base only in an amount of from 1 to 1.05 mol per mol of the monohaloacetic acid or the like used, in particular, per mol of the monohaloacetic acid salt used. However, when using the monohaloacetic acid, it is required to use an additional amount of the base which is enough to completely neutralize a carboxyl group thereof.

The amount of the monohaloacetic acid or the salt thereof used may be an amount corresponding to a desired substitution degree of the cellulose (mol of the substitution group to be introduced per mol of a glucose unit in a molecule of the cellulose) owing to the fact that the reaction can proceed in an extremely quantitative manner, so that the substitution degree of the cellulose can be appropriately controlled. The carboxymethyl group in the resulting carboxymethyl cellulose may be bonded to a hydroxyl group existing at any position of the glucose unit in a molecule of the cellulose.

(Reaction Conditions)

In the first embodiment of the present invention, the reaction temperature is preferably not higher than a boiling point of the monohaloacetic acid or the like, more specifically, preferably from 30 to 100° C. and more preferably from 40 to 80° C.

The reaction is preferably carried out under normal pressures, and in an atmosphere of an inert gas such as nitrogen, if required, from the viewpoint of avoiding undesirable coloration upon the reaction.

In the first embodiment of the present invention, the low-crystalline powdery cellulose, base and monohaloacetic acid or the like are preferably reacted with each other while being kept in a fluidizable power condition. More specifically, it is preferred that the powdery cellulose be previously uniformly mixed with one of the base and the monohaloacetic acid or the like using a mixing device such as a mixer or a shaker, and then the resulting mixture be reacted with the remainder of the base and the monohaloacetic acid or the like. The reaction under such a power condition is industrially convenient and advantageous because a burden of the step for removal of an organic solvent after completion of the reaction is reduced or eliminated.

In the reaction between the low-crystalline powdery cellulose and the monohaloacetic acid or the like, there is a possibility that the raw materials or the obtained reaction product are agglomerated owing to water being present in a reaction container upon the reaction (hereinafter also referred to as "in a reaction system") which includes water, etc., derived from the powdery cellulose or the base aqueous solution used in the reaction. For this reason, the amount of water being present in the reaction system is preferably adjusted to 100% by weight or less, more preferably 80% by weight or less, still more preferably 50% by weight or less and further still more preferably from 5 to 50% by weight on the basis of the weight of the powdery cellulose. When the amount of water being present in the reaction system lies within the above-specified range, the powdery cellulose as the raw material and carboxymethyl cellulose as the reaction product can be prevented from undergoing excessive agglomeration, and the reaction can be carried out under a fluidizable powder condition.

In order to maintain the water content in the reaction system on the basis of the powdery cellulose within the above-specified range, the reaction system both upon dropping the base aqueous solution and upon the reaction is preferably subjected to dehydration under reduced pressure, etc. The pressure used for the dehydration is preferably from 6.6 to 101 kPa and more preferably from 6.6 to 13.3 kPa.

The amount of the organic solvent used is preferably 10 times or less the weight of the low-crystalline powdery cellulose. From the viewpoint of carrying out the reaction under a fluidizable powder condition, the total amount of the organic solvent and the above water is preferably 100% by weight or less, more preferably 80% by weight or less and still more preferably 50% by weight or less on the basis of the powdery cellulose.

(Reaction Apparatus)

The reaction apparatus used in the first embodiment of the present invention is not particularly limited. In order to carry out the reaction under a fluidizable powder condition, there are preferably used those reaction apparatuses capable of mixing the low-crystalline powdery cellulose, base and monohaloacetic acid or the like as uniformly as possible. For example, there are preferably used mixing devices such as a so-called kneader for kneading resins, etc., as described in paragraph [0016] of JP 2002-114801A.

The mixing devices such as a kneader usable in the present invention is not particularly limited as long as it enables a sufficient stirring operation. For example, as described in "Chemical Engineering Handbook; Revised 5th Edition", edited by The Society of Chemical Engineers, Japan, published by Maruzen Co., Ltd., pp. 917 to 919, there may be used single-screw kneaders such as a ribbon mixer, a co-kneader, a Votator and a screw-type kneader, and twin-screw kneaders such as a double-arm type kneaders.

These mixing devices are preferably provided with a section capable of dropping the base aqueous solution or dehydrating the reaction system.

In the present invention, owing to an extremely high reaction selectivity of the monohaloacetic acid or the like to the cellulose, the amount of by-products derived from the monohaloacetic acid or the like is extremely small, so that the post treatments such as purification after completion of the reaction is facilitated. More specifically, in the present invention, in order to remove a trace amount of unreacted monohaloacetic acid or the like or a neutralized salt by-produced, the reaction product obtained after completion of the reaction is subjected, if required, to washing with hydrous isopropanol, hydrous acetone or the like solvent and then dried. Thus, the aimed carboxymethyl cellulose can be obtained by a simple purification treatment.

In addition, the resulting reaction mixture may be directly subjected to further derivative-production reactions, if required, after adding a catalytic amount of a base, etc., without conducting the purification treatment such as removal of the neutralized salt after completion of the reaction. With the above procedure, it is also possible to produce various cellulose ether derivatives from the powdery cellulose in an one-pot manner.

[Production of Hydroxyethyl Cellulose]

In the process for producing hydroxyethyl cellulose according to the second embodiment of the present invention, the above low-crystalline powdery cellulose is reacted with ethylene chlorohydrin in the presence of a base.

(Ethylene Chlorohydrin)

In the second embodiment of the present invention, since the reaction efficiency of ethylene chlorohydrin to the cellulose is very high, it becomes possible to obtain hydroxyethyl cellulose having a desired substitution degree according to the amount of ethylene chlorohydrin used. For example, ethylene chlorohydrin is preferably used in an amount of from 0.01 to 3 mol and more preferably from 0.1 to 2.5 mol per mol of a glucose unit in a molecule of the cellulose. In this case, the substitution degree of a hydroxyethyl group per a glucose unit in the cellulose is preferably from 0.01 to 3 and more preferably from 0.1 to 2.5.

Even when ethylene chlorohydrin is used in an amount of 3 mol or more per mol of a glucose unit in a molecule of the cellulose, it is possible to introduce a polyoxyethylene group onto the cellulose. However, in such a case, the amount of the base used as well as the amount of water produced owing to the base used are increased. As a result, there tends to occur such a risk that the reaction system is no longer kept in a powder condition and gelled upon the reaction. Therefore, in the case where it is intended to add and introduce a high molar number of a polyoxyethylene group into the cellulose, it is preferred that ethylene chlorohydrin be first added thereto in an amount of 3 mol or less per mol of a glucose unit in a molecule of the cellulose, and then after subjecting the resulting addition product to removal of the produced salt by washing and further to dehydration, the further addition of ethylene chlorohydrin to the addition product be carried out by adding again the base to the reaction system.

The method of adding ethylene chlorohydrin is not particularly limited. For example, ethylene chlorohydrin may be added by (a) a method in which after adding the base to the low-crystalline powdery cellulose, ethylene chlorohydrin is gradually dropped into the resulting mixture, or (b) a method in which after adding ethylene chlorohydrin to the low-crystalline powdery cellulose at one time, the base is added to the resulting mixture to react therewith. In any of these methods, the amount of water being present in the reaction container (reaction system) upon the reaction is preferably adjusted to 100% by weight or less, more preferably 80% by weight or less, still more preferably 50% by weight or less and further still more preferably from 5 to 50% by weight on the basis of the weight of the low-crystalline powdery cellulose. When the amount of water being present in the reaction system lies within the above-specified range, the powdery cellulose as the raw material and hydroxyethyl cellulose as the reaction product can be prevented from undergoing excessive agglomeration, and the reaction can be carried out under a fluidizable powder condition.

(Base)

The base used for production of hydroxyethyl cellulose may be the same as those bases used above for production of carboxymethyl cellulose. Among the bases, preferred are alkali metal hydroxides, more preferred are sodium hydroxide and potassium hydroxide, and still more preferred is sodium hydroxide. These bases may be used alone or in combination of any two or more thereof.

The base may be added in the form of a high-concentration aqueous solution, or may be added in the form of a dilute solution, followed by removing a surplus amount of water from the reaction system, and then subjected to the reaction. In any of the above cases, the reaction is preferably conducted in a fluidizable powder condition without forming a slurry or a high-viscous liquid. Therefore, even when the base is added in the form of a dilute solution, the content of water in the reaction system is preferably adjusted to 100% by weight or less and more preferably from 5 to 50% by weight on the basis of the weight of the low-crystalline powdery cellulose.

It is required that the base is used in a molar amount corresponding to the amount of ethylene chlorohydrin used. More specifically, the base is preferably used in an amount corresponding to from 0.01 to 3 mol and more preferably from 0.1 to 2.5 mol per mol of a glucose unit in a molecule of the cellulose similarly to the amount of ethylene chlorohydrin used.

(Reaction Conditions)

In the second embodiment of the present invention, the low-crystalline powdery cellulose, base and ethylene chlorohydrin are preferably reacted with each other while being kept in a fluidizable power condition. For example, after previously uniformly mixing the powdery cellulose is with one of the base and ethylene chlorohydrin using a mixing device such as a mixer or a shaker, if required, the resulting mixture may be reacted with the remainder of the base and ethylene chlorohydrin.

In addition, in the second embodiment of the present invention, the reaction may be carried out under a dispersed condition using not only water but also an organic solvent. As the organic solvent, there may be used the same organic solvents as used above for production of carboxymethyl cellulose.

When using such an organic solvent, it is not necessary to use the organic solvent in such a large amount as to dissolve the cellulose therein. Nevertheless, it is required that the amount of the organic solvent used is enough to well disperse the cellulose therein without causing aggregation thereof. However, if the organic solvent is used in an excessively large amount, the base such as alkalis tends to be considerably diluted, so that the reaction rate may be lowered.

Therefore, the amount of the organic solvent used is preferably 10 times or less the weight of the low-crystalline powdery cellulose. From the viewpoint of carrying out the reaction under a fluidizable powder condition, the total amount of water and the organic solvent is preferably 100% by weight or less, more preferably 80% by weight or less and still more preferably 50% by weight or less on the basis of the weight of the powdery cellulose.

In the second embodiment of the present invention, the reaction temperature is preferably from 0 to 100° C. and more preferably not higher than a boiling point of ethylene chlorohydrin, more specifically, in the range of from 10 to 80° C.

The reaction in the second embodiment of the present invention is preferably carried out under normal pressures, and in an atmosphere of an inert gas such as nitrogen, if required, from the viewpoint of avoiding undesirable coloration upon the reaction.

After completion of the reaction, in order to remove a trace amount of unreacted ethylene chlorohydrin or a neutralized salt by-produced, the resulting reaction product is subjected, if required, to washing with hydrous isopropanol, hydrous acetone or the like solvent and then dried to thereby produce hydroxyethyl cellulose. In addition, the reaction mixture obtained after completion of the reaction may be directly subjected to further derivative-production reactions, if required, after adding a catalytic amount of the base, etc., without conducting the purification treatment such as removal of the neutralized salt by washing after completion of the reaction, for example, may be directly reacted with glycidyl trimethyl ammonium chloride for synthesis of cationized hydroxyethyl celluloses. That is, various cellulose ether derivatives which are obtained using hydroxyethyl cellulose as a starting material can be produced from the cellulose in an one-pot manner.

The reaction apparatus used in the second embodiment of the present invention may be the same as used above for production of carboxymethyl cellulose.

In the present invention, owing to an extremely high reaction selectivity of ethylene chlorohydrin to the cellulose, the amount of by-products derived from ethylene chlorohydrin is extremely small, and a hydroxyethyl group can be introduced into the cellulose with a desired substitution degree, so that the post treatments such as purification after completion of the reaction is facilitated. The purification treatment may be carried out in the same manner as explained above in production of carboxymethyl cellulose.

In the second embodiment of the present invention, the hydroxyethyl group may be bonded to a hydroxyl group existing at any position of the glucose unit in a molecule of the cellulose, so that the substitution degree per a glucose unit in a molecule of the cellulose can be desirably controlled.

EXAMPLES

The crystallinity, polymerization degree, average particle size and water content of the low-crystalline celluloses obtained in the following Production Examples were measured by the following methods.

(1) Calculation of Crystallinity

The cellulose I-type crystallinity was calculated from an X-ray diffraction intensity of a sample as measured under the following conditions using a "Rigaku RINT 2500VC X-RAY diffractometer" available from Rigaku Corporation, according to the above formula (1).

Measuring Conditions:

X-ray source: Cu/Kα-radiation; tube voltage: 40 kV; tube current: 120 mA; measuring range: measured at a diffraction angle 2θ=5 to 45°; The sample to be measured was prepared by compressing pellets each having an area of 320 mm² and a thickness of 1 mm; X-ray scanning speed: 10°/min.

(2) Measurement of Polymerization Degree

The polymerization degree of the cellulose was measured by a copper/ammonia method as prescribed in ISO-4312 method.

(3) Measurement of Average Particle Size

The average particle size was measured using a laser diffraction/scattering-type particle size distribution measuring instrument "LA-920" available from Horiba Ltd. The measurement was carried out under the following conditions. That is, the particles to be measured were previously subjected to ultrasonic treatment for 1 min, and the volume-based median diameter thereof was measured at 25° C. using water as a dispersing medium upon the measurement. Meanwhile, the refractive index used in the above measurement was 1.2.

(4) Measurement of Water Content

The water content was measured at 150° C. using an infrared moisture meter "FD-610" available from Kett Electric Laboratory.

Production Example 1-1

Production of Amorphized Powdery Cellulose

First, a commercially available wood pulp sheet (pulp sheet available from Borregaard Inc.; crystallinity: 74%) was cut into chips of 1 cm square using a shredder "MSX2000-IVP440F" available from Meikoshokai Co., Ltd. Then, the thus obtained pulp chips were charged into a twin-screw extruder "EA-20" available from Suchiro EPA Corporation, which was equipped at a central portion of its screws with a kneading disk block, at a feed rate of 2 kg/h, and passed through the extruder one time at shear rate of 660 $sec^{-1}$ and a screw rotating speed of 300 rpm while flowing a cooling water from outside therethrough to obtain a powder.

Next, 100 g of the thus obtained powdery cellulose were charged into a batch-type media-stirring type ball mill "ATTRITOR" available from Mitsui Mining Co., Ltd., (container capacity: 800 mL; filled with 1400 g of 6 mm$\phi$ steel balls; diameter of agitation blade: 65 mm). While flowing a cooling water through a container jacket of the mill, the powdery cellulose was pulverized at a stirring speed of 600 rpm for 3 h, thereby obtaining a powdery cellulose (crystallinity: 0%; polymerization degree: 600; average particle size: 40 μm). In the following reaction, as the powdery cellulose, there were used undersize particles thereof obtained by further passing the powdery cellulose through a 32-μm mesh sieve.

Example 1-1

A 1-L kneader "PNV-1 Model" available from Irie Shokai Co., Ltd., was charged with 80.0 g (0.47 mol in terms of glucose unit) of the amorphized powdery cellulose (crystallinity: 0%; polymerization degree: 600; average particle size: 40 μm; water content: 5% by weight) obtained in Production Example 1-1 and 58.0 g (0.50 mol) of sodium chloroacetate (reagent available from Wako Pure Chemical Industries, Ltd.), and the contents of the kneader were stirred in a nitrogen atmosphere for 6 h. Then, after heating the resulting material to 50° C. in a nitrogen atmosphere, 42.0 g of a 48 wt % sodium hydroxide aqueous solution (amount of NaOH: 0.50 mol) were dropped thereinto over 2 h, followed by stirring the resulting mixture as such at 50° C. for 6 h. During the reaction, the cellulose and the reaction product were maintained in a fluidizable powder condition without being aggregated together (total content of water derived from the cellulose and the other raw materials on the basis of the weight of the cellulose: 13% by weight).

After completion of the reaction, the resulting reaction mixture was cooled to room temperature, and the obtained reaction product was taken out from the kneader, washed with 3,000 mL of hydrous isopropanol (water content: 15% by mass) and 1,000 mL of isopropanol to remove salts by-produced and the unreacted raw materials therefrom, and then dried, thereby obtaining 114 g of a white solid.

As a result of analyzing the thus obtained white solid using an infrared spectrophotometer (FT-IR measuring apparatus "FT-710" available from Horiba Ltd.), the white solid was identified to be carboxymethyl cellulose (Na salt form). The infrared spectrum obtained in the above analysis is shown in FIG. 1.

It was confirmed that the substitution degree of a carboxymethyl group per a glucose unit of the thus obtained carboxymethyl cellulose which was calculated from the amount of the substituent group introduced thereto was 1.0. Also, it was confirmed that the reaction selectivity to the cellulose based on sodium chloroacetate as the raw material was 95%, and the reaction therefore proceeded substantially in a quantitative manner.

Example 1-2

A 1-L kneader "PNV-1 Model" available from Irie Shokai Co., Ltd., was charged with 70.0 g (0.41 mol in terms of glucose unit) of the amorphized cellulose (crystallinity: 0%; polymerization degree: 600; average particle size: 40 μm; water content: 5% by weight) obtained in Production Example 1-1 and 70.0 g (0.60 mol) of sodium chloroacetate (reagent available from Wako Pure Chemical Industries, Ltd.), and the contents of the kneader were stirred in a nitrogen atmosphere for 6 h. Then, after heating the resulting material to 50° C. in a nitrogen atmosphere, 52.0 g of a 48 wt % sodium hydroxide aqueous solution (amount of NaOH: 0.62 mol) were dropped thereinto over 5 h, followed by stirring the resulting mixture as such at 50° C. for 12 h. During the reaction, the cellulose and the reaction product were maintained in a fluidizable powder condition without being aggregated together (total content of water derived from the cellulose and the other raw materials: 15% by weight).

After completion of the reaction, the resulting reaction mixture was cooled to room temperature, and the obtained reaction product was taken out from the kneader, washed with 3,000 mL of hydrous isopropanol (water content: 15% by mass) and 1,000 mL of isopropanol to remove salts by-produced and the unreacted raw materials therefrom, and then dried, thereby obtaining 115 g of carboxymethyl cellulose (of an Na salt type) as a white solid.

It was confirmed that the substitution degree of a carboxymethyl group per a glucose unit of the thus obtained carboxymethyl cellulose which was calculated from the amount of the substituent group introduced thereto was 1.4. Also, it was confirmed that the reaction selectivity to the cellulose based on sodium chloroacetate as the raw material was 97%, and the reaction therefore proceeded substantially in a quantitative manner.

Comparative Example 1-1

The reaction was carried out in the same manner as in Example 1-1 except for using commercially available powdery cellulose (cellulose powder "KC FLOCK"; crystallinity: 74%; average particle size: 45 μm; water content: 5% by weight) available from Nippon Paper Chemicals Co., Ltd., as the powdery cellulose. As the reaction proceeded, the cellulose was partially aggregated, so that the obtained reaction mixture was extremely non-uniform and sufficient mixing of the aggregated mixture in the reactor was not achieved. However, the reaction procedure was continued as such to remove salts by-produced and the unreacted raw materials from the reaction mixture and dry the obtained reaction product in the same manner as in Example 1-1.

It was confirmed that the substitution degree of a carboxymethyl group per a glucose unit of the thus obtained product which was calculated from the amount of the substituent group introduced thereinto was 0.93, and the reaction selectivity to the cellulose based on sodium chloroacetate as the raw material was 89%.

Production Example 2-1

Production of Amorphized Powdery Cellulose

A commercially available wood pulp sheet (pulp sheet available from Borregaard Inc.; crystallinity: 74%) was cut into chips of 1 cm square using a shredder "MSX2000-IVP440F" available from Meikoshokai Co., Ltd. Then, the thus obtained pulp chips were charged into a twin-screw extruder "EA-20" available from Suchiro EPA Corporation, which was equipped at a central portion of its screws with a kneading disk block, at a feed rate of 2 kg/h, and passed through the extruder one time at shear rate of 660 sec$^{-1}$ and a screw rotating speed of 300 rpm while flowing a cooling water from outside therethrough to obtain a powder.

Next, the thus obtained powdery cellulose was charged into a batch-type medium-stirring mill "SAND GRINDER" (available from Igarashi Kikai Co., Ltd.) having a container capacity of 800 mL which was filled with 720 g of 5 mmϕ zirconia beads at a filling ratio of 25% and fitted with an agitation blade having a diameter of 70 mm. While flowing a cooling water through a container jacket of the mill, the powdery cellulose was pulverized at a stirring speed of 2,000 rpm and a temperature of from 30 to 70° C. for 2.5 h, thereby obtaining a powdery cellulose (crystallinity: 0%; polymerization degree: 600; average particle size: 40 µm). In the following reaction of the powdery cellulose, there were used undersize particles thereof (90% of the raw cellulose charged) obtained by further passing the powdery cellulose through a 32 µm-mesh sieve.

Meanwhile, various powdery celluloses which were different in crystallinity from each other were prepared by changing a treating time thereof in the ball mill.

Example 2-1

A 1-L kneader "PNV-1 Model" available from Irie Shokai Co., Ltd., was charged with 100 g of the amorphized cellulose (crystallinity: 0%; polymerization degree: 600; average particle size: 40 µm; water content: 5% by weight) obtained in Production Example 2-1 and 51 g of a 48% sodium hydroxide aqueous solution (amount of NaOH: 0.61 mol), and the contents of the kneader were stirred in a nitrogen atmosphere for 1 h. Thereafter, 70 g of ethylene chlorohydrin (0.87 mol; guaranteed reagent "2-chloroethanol" available from Wako Pure Chemical Industries, Ltd.) was dropped into the kneader over 3 h. Then, the contents of the kneader were further stirred at room temperature for 20 h. During the reaction, the cellulose was maintained in a fluidizable powder condition. Thereafter, since it was confirmed that the reaction system had a pH value of 7.0, i.e., completely neutral, unreacted ethylene chlorohydrin was distilled off under reduced pressure. Then, the obtained reaction product was taken out from the 1 L kneader, washed with hydrous isopropanol (water content: 15% by mass) and acetone, and then dried under reduced pressure, thereby obtaining 126 g of hydroxyethyl cellulose (theoretical amount: 127 g) as a white solid. As a result, it was confirmed that the substitution degree of a hydroxyethyl group per a glucose unit in a molecule of the cellulose was 1.0, and the reaction therefore proceeded in a suitable manner.

Example 2-2

The above 1-L kneader was charged with 100 g of the amorphized cellulose (crystallinity: 0%; polymerization degree: 600) obtained in Production Example 2-1 and 45 g of a 48% sodium hydroxide aqueous solution (amount of NaOH: 0.54 mol), and the contents of the kneader were stirred in a nitrogen atmosphere for 1 h. Thereafter, 35 g (0.44 mol) of the ethylene chlorohydrin used above was dropped into the kneader over 3 h. Then, the contents of the kneader were further stirred as such at room temperature for 18 h. As a result of NMR analysis, it was confirmed that the residual rate of ethylene chlorohydrin as the raw material was as small as 6% only. Then, the resulting reaction mixture was neutralized with acetic acid, and the obtained reaction product was taken out from the kneader, washed with hydrous isopropanol (water content: 15% by mass) and acetone, and then dried under reduced pressure, thereby obtaining 118 g of hydroxyethyl cellulose (theoretical amount: 126 g) as a white solid. As a result, it was confirmed that the substitution degree of a hydroxyethyl group per a glucose unit of the cellulose was 0.71, and the reaction therefore proceeded in a suitable manner.

Example 2-3

A 3 L four-necked flask was charged with 100 g of the amorphized cellulose (crystallinity: 0%; polymerization degree: 600) obtained in Production Example 2-1 and 51 g of a 48% sodium hydroxide aqueous solution (amount of NaOH: 0.61 mol), and 800 mL of dimethyl sulfoxide (9 parts by weight based on the amorphized cellulose) were added and dispersed in the flask. After stirring the contents of the flask at room temperature for 1 h, 70 g (0.87 mol) of ethylene chlorohydrin were dropped thereinto over 1 h, followed by further stirring the contents of the flask as such for 22 h. Then, the resulting reaction mixture was neutralized with acetic acid, and after distilling off unreacted ethylene chlorohydrin and dimethyl sulfoxide therefrom, the obtained reaction product was taken out from the flask, washed with hydrous isopropanol (water content: 15% by mass) and acetone, and then dried under reduced pressure, thereby obtaining 115 g of hydroxyethyl cellulose as a white solid. As a result, it was confirmed that the substitution degree of a hydroxyethyl group per a glucose unit of the cellulose was 0.65, and the reaction therefore proceeded in a suitable manner.

Comparative Example 2-1

The reaction was carried out in the same manner as in Example 2-3 except for using high-crystalline powdery cellulose (cellulose powder "KC FLOCK W-50(S)"; crystallinity: 74%; polymerization degree: 500) available from Nippon Paper Chemicals Co., Ltd., as the cellulose and further using 2 L of dimethyl sulfoxide. Then, the resulting reaction mixture was neutralized with acetic acid, and after distilling off unreacted ethylene chlorohydrin and dimethyl sulfoxide therefrom, the obtained reaction product was taken out from the flask, washed with hydrous isopropanol (water content: 15% by mass) and acetone, and then dried under reduced pressure, thereby obtaining hydroxyethyl cellulose as a light-brownish white solid. However, the amount of hydroxyethyl cellulose obtained above was as small as 98 g only, and no increase in weight of the reaction product after the reaction was observed. Also, it was confirmed that the substitution degree of a hydroxyethyl group per a glucose unit of the cellulose was as small as 0.05 only.

From the above results, it was recognized that in Examples 2-1 to 2-3, the hydroxyethyl celluloses having a desired substitution degree were produced with a higher efficiency as compared to Comparative Example 2-1.

Application Example 2-1

The above 1-L kneader was charged with 100 g of the amorphized cellulose (crystallinity: 0%; polymerization degree: 600; average particle size: 40 μm; water content: 5% by weight) obtained in Production Example 2-1 and 45 g of a 48% sodium hydroxide aqueous solution (amount of NaOH: 0.54 mol), and the contents of the kneader were stirred in a nitrogen atmosphere for 1 h. Thereafter, 35 g (0.44 mol) of the above ethylene chlorohydrin was dropped into the kneader, and the contents of the kneader were stirred at room temperature for 18 h. As a result of NMR analysis, it was confirmed that the residual percentage of ethylene chlorohydrin as the raw material was 6%.

Next, the kneader was heated to 50° C., and the contents of the kneader were stirred for 1 h. Thereafter, without subjecting the resulting reaction mixture to purification (removal of salts produced), 84 g of glycidyl trimethyl ammonium chloride (available from Sakamoto Yakuhin Kogyo Co., Ltd.; water content: 20% by weight; purity: 90% or more) were dropped into the reaction mixture as such over 1 h. The resulting reaction mixture was further stirred at 50° C. for 5 h, and then neutralized with acetic acid, and the obtained reaction product was washed with hydrous isopropanol (water content: 15% by mass) and acetone, and then dried under reduced pressure, thereby obtaining 200 g of a cationized hydroxyethyl cellulose as a light-brownish white solid. As a result, it was confirmed that the chlorine element content in the reaction product was 9.4%, the nitrogen element content therein was 3.7%, the substitution degree of a hydroxyethyl group in the cellulose was 0.70 per a glucose unit of the cellulose, and the substitution degree of the cationic group in the cellulose was 0.71 per a glucose unit of the cellulose. Therefore, it was recognized that the cationized hydroxyethyl cellulose was produced with an extremely high efficiency.

INDUSTRIAL APPLICABILITY

In accordance with the process of the present invention, a cellulose ether derivative such as carboxymethyl cellulose and hydroxyethyl cellulose can be produced with a high efficiency and a high selectivity in a convenient manner. Therefore, the process of the present invention is extremely useful from the industrial viewpoints.

The carboxymethyl cellulose obtained according to the present invention can be used in extensive applications as a component to be compounded in thickeners, dispersants, emulsifiers, protective colloid agents, stabilizers, etc., and as a starting material for production of the other cellulose ether derivatives.

Also, the hydroxyethyl cellulose obtained according to the present invention can be used in extensive applications as a compounding component such as a dispersant and a stabilizer which are used in paints, cosmetics, building materials, thickeners, adhesives, drugs or the like, and as a starting material for production of the other cellulose ether derivatives.

The invention claimed is:

1. A process for producing a cellulose ether compound comprising
   milling cellulose having a crystallinity of greater than 50%, thereby forming a low-crystalline powdery cellulose having a crystallinity of 50% or less, and
   reacting said low-crystalline powdery cellulose having a crystallinity of 50% or less with an organohalide compound in the presence of a base under a fluidizable powder condition,
   wherein during said reacting the water content is 50% by weight or less based on the weight of the low-crystalline powdery cellulose, and
   wherein during said reacting the total amount of organic solvent and water is 100% by weight or less based on the weight of the low-crystalline powdery cellulose.

2. The process for producing a cellulose ether compound according to claim 1, wherein the organohalide compound is at least one compound selected from the group consisting of ethylene chlorohydrin, a monohaloacetic acid and a salt of the monohaloacetic acid.

3. The process for producing a cellulose ether compound according to claim 1, wherein the low-crystalline powdery cellulose has an average particle size of from 20 to 300 μm.

4. The process for producing a cellulose ether compound according to claim 3, wherein the average particle size is no greater than 150 μm.

5. The process for producing a cellulose ether compound according to claim 3, wherein the average particle size is no greater than 100 μm.

6. The process for producing a cellulose ether compound according to claim 3, wherein the average particle size is no greater than 50 μm.

7. The process for producing a cellulose ether compound according to claim 3, wherein the average particle size is no less than 25 μm.

8. The process for producing a cellulose ether compound according to claim 1, wherein the base is an alkali metal hydroxide or an alkali earth metal hydroxide.

9. The process for producing a cellulose ether compound according to claim 1, wherein during said reacting the water content is 5% to 50% by weight or less based on the weight of the low-crystalline powdery cellulose.

10. The process for producing a cellulose ether compound according to claim 1, wherein the organohalide compound comprises a salt of monochloroacetic acid.

11. The process for producing a cellulose ether compound according to claim 1, wherein the organohalide compound is a salt of monochloroacetic acid.

12. The process for producing a cellulose ether compound according to claim 1, wherein the cellulose ether is carboxymethylcellulose and the organohalide is a monohaloacetic acid or a salt of the monohaloacetic acid.

13. The process for producing a cellulose ether compound according to claim 1, wherein the cellulose ether is hydroxyethylcellulose and the organohalide is ethylene chlorohydrin.

14. The process for producing a cellulose ether compound according to claim 1, wherein the crystallinity of the low-crystalline powdery cellulose is 40% or less.

15. The process for producing a cellulose ether compound according to claim 1, wherein the crystallinity of the low-crystalline powdery cellulose is 30% or less.

16. The process for producing a cellulose ether compound according to claim 1, wherein the crystallinity of the low-crystalline powdery cellulose is substantially 0%.

17. The process for producing a cellulose ether compound according to claim 1, wherein the low-crystalline powdery cellulose has a polymerization degree of from 100 to 2,000.

18. The process for producing a cellulose ether compound according to claim 17, wherein the polymerization degree is from 100 to 1,000.

* * * * *